(12) United States Patent
Seeley (10) Patent No.: US 7,778,880 B2
(45) Date of Patent: Aug. 17, 2010

(54) SYSTEM AND METHODS FOR REMOTE ACCESS TO STORED ITEMS

(75) Inventor: David Seeley, Eden Prairie, MN (US)

(73) Assignee: Molly Seeley, Eden Prairie, MN (US)

( * ) Notice: Subject to any disclaimer, the term of this patent is extended or adjusted under 35 U.S.C. 154(b) by 1242 days.

(21) Appl. No.: 11/338,177

(22) Filed: Jan. 24, 2006

(65) Prior Publication Data

US 2007/0174130 A1 Jul. 26, 2007

(51) Int. Cl.
G06Q 30/00 (2006.01)

(52) U.S. Cl. ........................................ 705/26
(58) Field of Classification Search .................. 705/26, 705/27

See application file for complete search history.

(56) References Cited

U.S. PATENT DOCUMENTS

| 5,671,697 A * | 9/1997 | Rutman ................. 119/473 |
| 5,946,660 A | 8/1999 | McCarty et al. |
| 6,904,410 B1 | 6/2005 | Weiss et al. |
| 2002/0107777 A1 | 8/2002 | Lane et al. |
| 2002/0184114 A1 | 12/2002 | Jorgensen |
| 2004/0098319 A1 | 5/2004 | Senker |
| 2004/0230439 A1 | 11/2004 | Aptekar |
| 2006/0122858 A1 * | 6/2006 | Miles et al. ................. 705/1 |

FOREIGN PATENT DOCUMENTS

| JP | 2004015356 A | * | 1/2004 |
| JP | 2007-280339 A | * | 10/2007 |

OTHER PUBLICATIONS

H.S. Ahn et al. "PDA-Based Mobile Robot System with Remote Monitoring for Home Environment", 2009 IEEE.*

* cited by examiner

Primary Examiner—Naeem Haq
(74) Attorney, Agent, or Firm—Fredrikson & Byron, P.A.

(57) ABSTRACT

Remote access to a computerized inventory, which includes images of items stored in a storage unit that is assigned to a customer, is provided so that the customer may view the images of the stored items. The remote access may further allow the customer to select particular items, according to the images, and send instructions to a storage facility representative, concerning those selected items.

28 Claims, 7 Drawing Sheets

SYSTEM AND METHODS FOR REMOTE ACCESS TO STORED ITEMS

BACKGROUND

There are many different types of facilities that provide storage space for excess items, ranging from climate controlled warehouses to portable crates. Customers of storage facilities may be those who are planning to move from one home to another and would like to remove excess furniture or other items from their current home during the home selling process, or those who have moved from a larger space into a smaller space, either temporarily or permanently, where there is insufficient room for all their items. Often times a storage customer would like to retrieve or otherwise transfer particular, selected items from the storage facility; when this situation arises, it is necessary for the customer to go to the storage facility to identify those items and to segregate them from the remainder. Thus, there is a need for a more convenient method by which a storage customer may select and segregate particular items from a collection of items stored in a storage facility.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention.

Figure 1A:
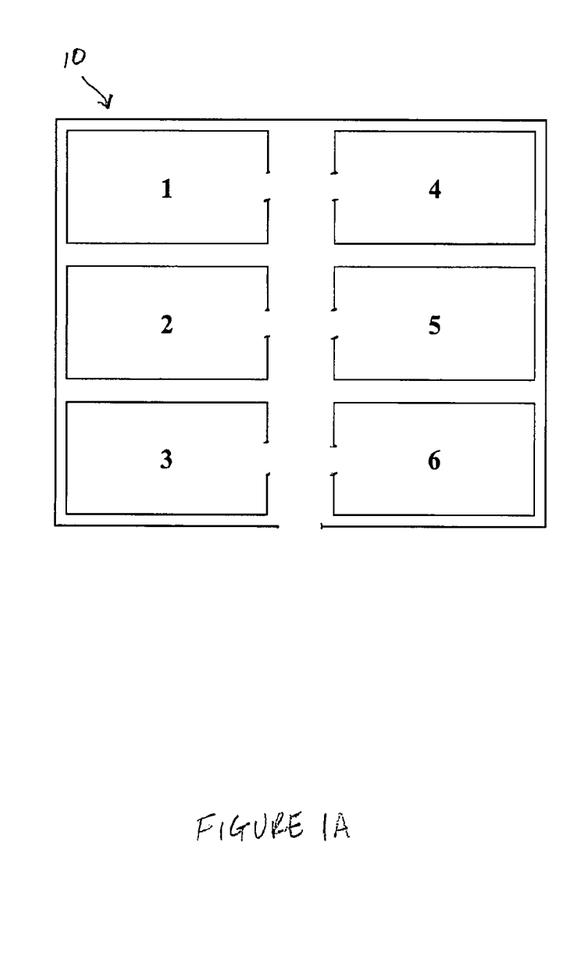
FIG. 1A is a plan view of an exemplary storage facility according to some embodiments of the present invention.

FIG. 1A is a plan view of an exemplary storage facility 10, according to some embodiments of the present invention. FIG. 1A illustrates storage facility 10 including individual storage units or vaults 1, 2, 3, 4, 5 and 6; according to embodiments of the present invention, one or more of vaults 1-6 is assigned to an individual customer for storage of items belonging to the customer. For example, vaults 2 and 3 may be assigned to the customer for storage of two groups of items, which may be arbitrarily assigned to vaults 2 and 3, or may be categorized so that items stored in vault 2 are of one category and items stored in vault 3 are of another category. According to some embodiments of the present invention, each vault 1, 2, 3, 4, 5, 6 is a portable storage container that has been transported to a location where a customer has items requiring storage; at each customer site, the customer's items are loaded into one or more of the vaults or containers, which are then transported into storage facility 10 where the stored items remain in the containers. According to alternate embodiments of the present invention, vaults 1, 2, 3, 4, 5, 6 are rooms in a storage facility and items for storage are delivered by truck or moving van to the customer's assigned vault.

Figure 1B:
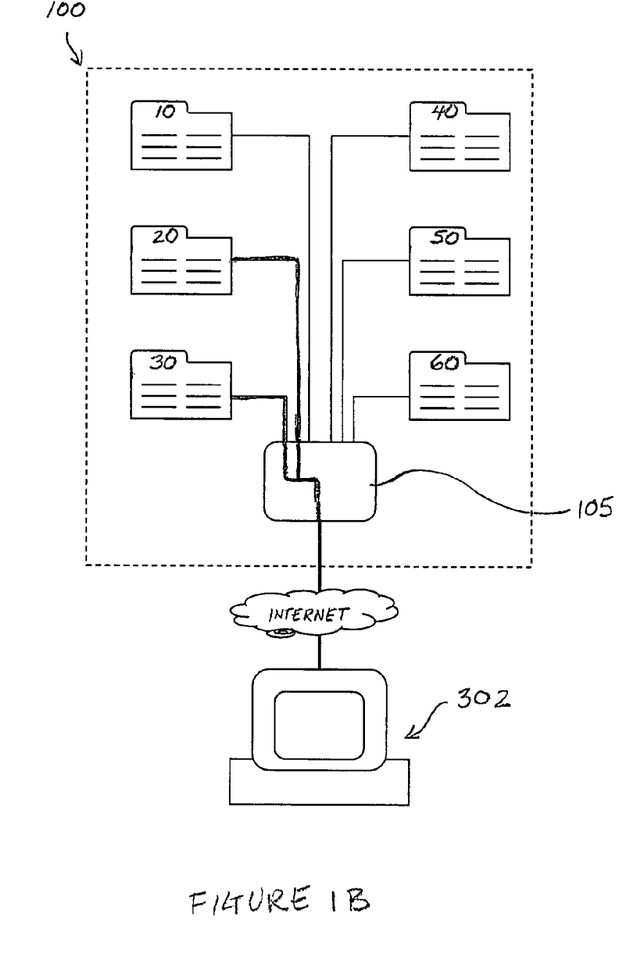
FIG. 1B is a schematic diagram of a remote access portion of a storage system, according to some embodiments of the present invention.

FIG. 1B is a schematic diagram of a remote access portion of a storage system, which includes vaults or storage units 1, 2, 3, 4, 5, 6 illustrated in FIG. 1A, according to some embodiments of the present invention. FIG. 1B illustrates a database 100 including inventories 10, 20, 30, 40, 50 and 60 corresponding to vaults 1, 2, 3, 4, 5 and 6, respectively; according to embodiments of the present invention, each inventory includes a record corresponding to each item stored in each vault 1-6, and each record includes a photographic image of the corresponding item. FIG. 1B further illustrates a remote access site 302, in the form of a personal computer, that is linked to database 100 via the Internet and is provided access to inventories 20 and 30 via a database 'gatekeeper' 105. According to the illustrated embodiment, a customer associated with access site 302 owns the items stored in vaults 2 and 3, and now has access to the associated computer inventories 20 and 30; according to some embodiments of the present invention, the customer has been provided with an unique identifier, for example a login name and a password, that provides the customer access, via 'gatekeeper' 105, to inventories 20 and 30.

Figure 2:
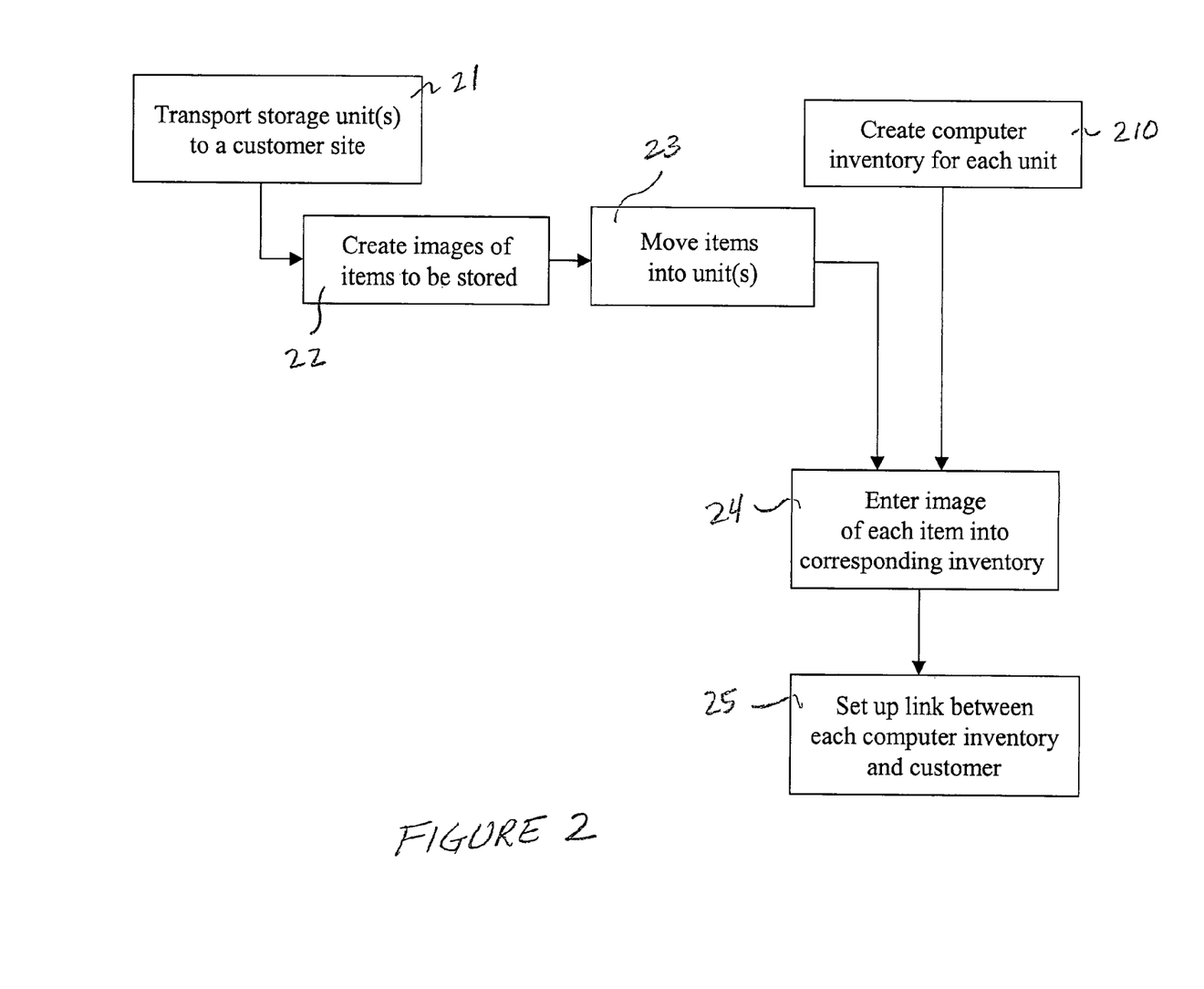
FIG. 2 is a flow chart outlining some methods of the present invention for establishing a system according to some embodiments of the present invention.

FIG. 2 is a flow chart outlining some methods of the present invention for establishing a system, such as that illustrated in FIGS. 1A-B, according to some embodiments of the present invention. FIG. 2 illustrates an initial step 21 in which one or more containers or storage units are transported to a customer site where items that a customer wants stored will be moved into the unit(s) and then transported to a storage facility. Of course, according to alternate methods, the items could be transported from the customer site to the storage unit(s) residing at a storage facility. At step 22, a photographic image of each item is created, for example with a digital camera; a group of images corresponding to each item destined for a particular storage unit may be saved to an individual storage device including a computer readable medium, for example a compact flash card. Although FIG. 2 illustrates step 22 preceding step 23, in which the items are moved into the storage unit(s), it should be understood that the image of each item could alternately be created after the moving the item into the corresponding storage unit.

A step 210 of FIG. 2 shows creation of the computer inventory, which may be accomplished at any time after the customer has requested the storage unit(s); if created prior to steps 21-23, the inventory would initially be defined by at least an assigned customer number and the associated storage unit number(s). At step 24 of FIG. 2, the image of each item is entered into a record of the corresponding computer inventory; according to one embodiment, digital images stored in a compact flash card corresponding to each storage unit are downloaded into the corresponding inventory by inserting the card into a reader, for example, connected, via a USB port, to the computer holding the database containing the inventory. According to an alternate method, as each image is created, it is automatically and simultaneously entered into the corresponding computer inventory, for example via wireless communication. It should be noted that a computer record for each stored item may further include one or more other types of information to identify the corresponding stored item, for example, a name of the item and a bar code identification. A SKU (Stock-Keeping Unit) number of such a bar code identification, may include digits that, in addition to identifying the item, would correspond to features of the item that are not adequately described in the image. A bar code identification may be useful for insurance purposes, for example, being associated with additional detailed information concerning an existing condition, or specific existing damage, of particular items. The bar code may be entered as a file title for each photographic image, when each image is created, and/or be printed on a label that is adhered to the associated item for future reference when completing the record for each item in the computerized inventory.

Once the inventory for each storage unit has been established, a link between one or more inventories and the associated customer is set up as indicated in step 25; the link provides the customer with remote access to each inventory of assigned storage units. According to some embodiments, as described in conjunction with FIG. 1B, the link includes a personal computer of the customer hooked up to database 100 via the Internet. It should be understood that personnel accomplishing the steps in FIG. 2 may be employed by a separate entity from that of the storage facility where the items in the storage units are stored, for example, a moving company providing the services of transport and remote access for the customer.

Figure 3A:
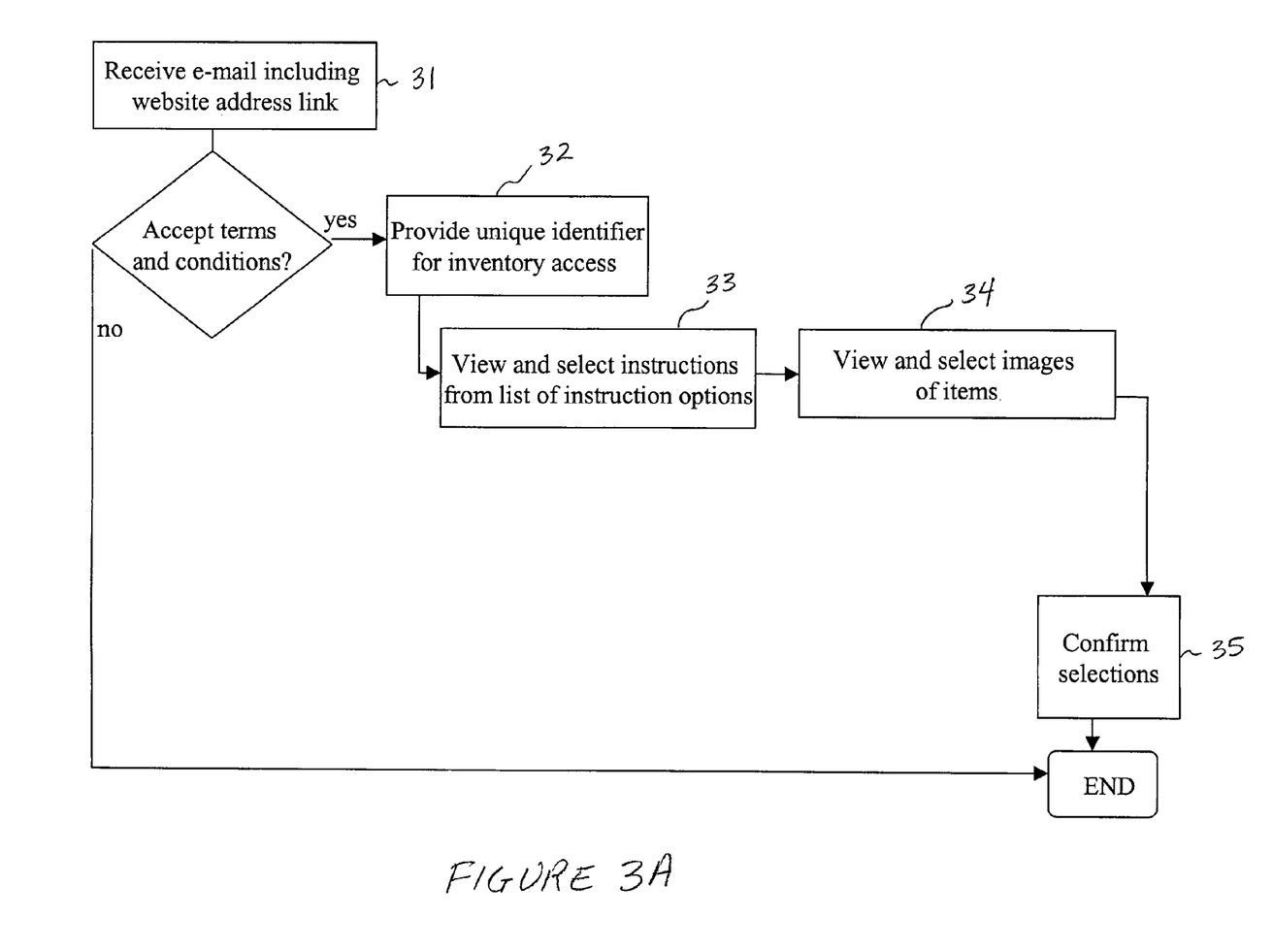
FIG. 3A is a flowchart outlining a method of the present invention for using a remote access portion of a storage system according to some embodiments of the present invention.

FIG. 3A is a flowchart outlining a method of the present invention for using a remote access portion of a storage system according to some embodiments of the present invention. Some embodiments of the system include computer inventories in a database, for example inventories 10-60 of database 100 (FIG. 1B), accessible via an Internet website. According to an initial step 31, a storage facility customer receives an e-mail from the storage facility (or a moving company) that provides an option for the customer to remotely access stored items, via a website. Terms and conditions of the remote access privilege may be presented in the e-mail or upon linking to the website, and once the customer has accepted the terms and conditions, the customer is authorized to access the inventory or inventories corresponding to stored items of the customer. Authorization may be given in response to the customer providing an unique identifier (step 32), for example a login name and password, created for the customer by the storage facility and included in the e-mail. According to methods of the present invention, once the customer has access, the customer may use the website to select items and send instructions, concerning the selected items, via interactive elements of the website, to the storage facility as outlined in steps 33-35.

Figure 3B:
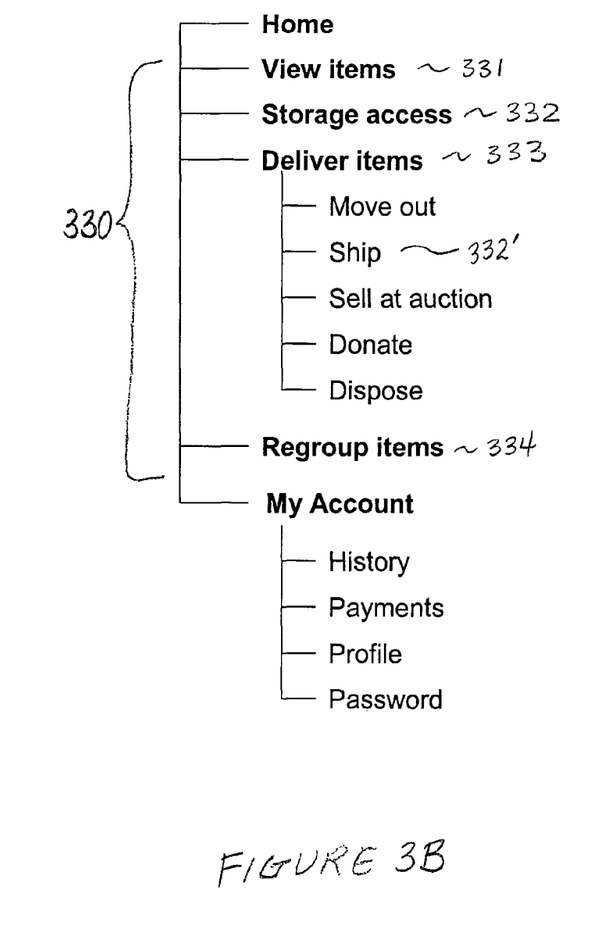
FIG. 3B is an exemplary website navigation tree for a remote access portion of a storage system corresponding to the flowchart of FIG. 3A.

According to step 33, the customer selects from a list of instructions presented at the website; FIG. 3B shows a website navigation tree that includes the list of selectable instructions denoted by item number 330. According to the illustrated embodiment, the customer may select to simply view the items in storage (331), to gain access to certain items in storage (332), to deliver the items in storage (333), or to regroup the items in storage (334). The selection of 'deliver items' 333 includes further options of 'move out', 'ship', 'sell at auction', 'donate' and 'dispose'. According to some embodiments, once the customer selects, for example, 'clicks on', one of the instructions from the list 330, which may be presented on one or more pages of the website, the customer is directed through a series of web pages corresponding to the selected instruction; each page of the series includes fields for entry of additional information, for example a date, a time, and an address, and/or fields for making selections. The following are presented as examples for each of the instructions.

For the selection of 'view items', one or more groups of photographic images, each corresponding to a group of items, is displayed, the groups being organized according to a vault name or number. According to some embodiments of the present invention, the web pages associated with this selection include interactive elements that allow the customer to assign unique identifiers to each item, for example a name of the item such as 'desk', and to each storage vault, for example a name of a location from which the item has been moved, for example 'first floor office', for future reference. According to embodiments of the present invention wherein bar code identification is incorporated, the customer may further view the information associated with the bar code corresponding to each coded item, for example being presented alongside or below the corresponding image of each item. Those skilled in the art will appreciate that these bar codes, having been entered into the record for corresponding items in the associated computer inventory, would be translated by the system into descriptions of the items that can be interpreted by the customer.

For the selection of 'storage access', fields are displayed in which the customer may enter a desired date and time when they would like to come to the storage facility to have access to stored items; and, again, groups of photographic images, each corresponding to a group of items, are displayed so that the customer may indicate which items to which the customer would like to have access. Storage facility personnel may then make the selected items accessible by the time the customer arrives at the storage facility. The series of web pages may further include: a display of the photographic images of the selected items for verification by the customer; a display of the entered time and date for verification by the customer; a display of a handling fee for the access requested; fields for entry of credit card information for automatic payment of the fee through the website; and a display of salient information concerning the instructions for confirmation.

For the selection of 'move out', fields are displayed in which the customer may enter a desired moving address, if applicable, and a date and time when the customer would like one or more groups of items moved out from associated storage vaults, along with a listing of vaults from which to choose the one or more groups of items. The series of web pages may further include a page displaying entered information for confirmation of the instructions as well as a listing of remaining vaults, if any.

For the selection of 'ship', fields are displayed in which the customer may enter a desired date when the customer would like to ship one or more selected stored items and a delivery address for the selected item(s). Again, groups of photographic images, each corresponding to a group of items, are also displayed so that the customer may indicate which items the customer would like to ship. The series of web pages may further include a page displaying entered information for confirmation of the instructions, a page displaying cost information, and a page for payment processing.

For the selection of 'sell at auction', groups of photographic images, each corresponding to a group of items, are displayed so that the customer may select which items the customer would like to sell; a field for entering a selling price is associated with each image. The series of web pages may further include a page displaying entered information for confirmation of the instructions, a page displaying cost information, and a page for payment processing. The storage facility may sell the selected items at a traditional auction or via an Internet auctions, for example partnering with established Internet auction sites.

For the selection of 'donate', fields are displayed for the customer to enter a charitable organization; or, a list of charitable organizations, with which the storage facility has partnered and from which the customer may select, is displayed. Again, groups of photographic images, each corresponding to a group of items, are also displayed so that the customer may indicate which items the customer would like to donate. The series of web pages may further include a page displaying entered information for confirmation of the instructions, a page displaying fee information, and a page for payment processing.

For the selection of 'dispose', groups of photographic images, each corresponding to a group of items, are displayed so that the customer may select which items the customer would like to throw out, that is, designate for removal as rubbish or trash. The series of web pages may further include a page displaying entered information for confirmation of the instructions, a page displaying fee information, and a page for payment processing.

For the selection of 'regroup items', groups of photographic images, each corresponding to a group of items, are displayed so that the customer may select which items the customer would like to move to a different vault among the vaults assigned to the customer; a field for entering a number or name associated with the different vault is associated with each image. The series of web pages may further include a page displaying entered information for confirmation of the instructions, a page displaying fee information, and a page for payment processing.

Figure 3C:
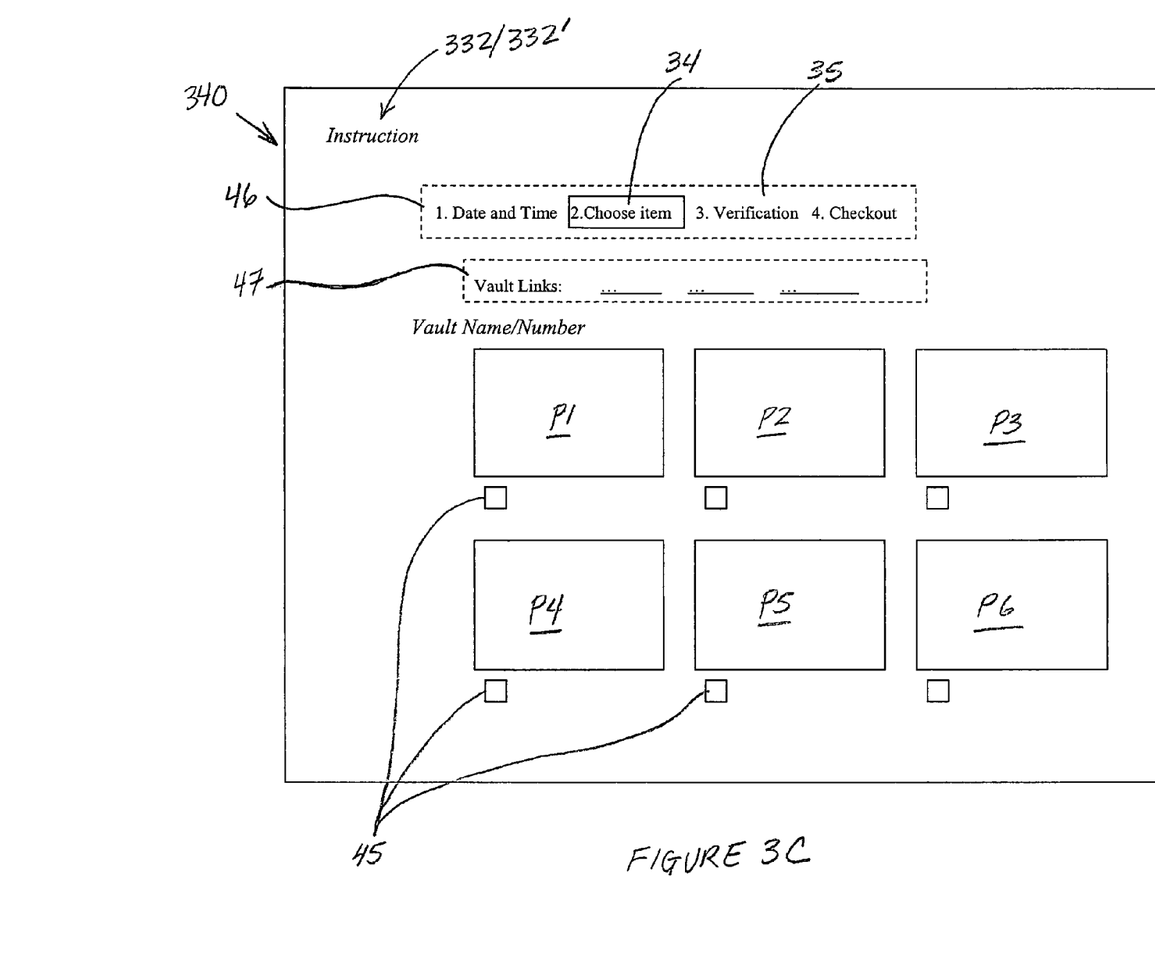
FIG. 3C is an exemplary user interface corresponding to the tree of FIG. 3B.

Aside from the selection of 'move out', it may be appreciated from the descriptions above that each series of web pages includes a page which displays the photographic image of each item stored in a particular storage vault and corresponding interactive elements provided so that the customer may select particular items from among each group of items, corresponding to step 34 shown in FIG. 3A. For example, FIG. 3C illustrates an exemplary web page 340, which may correspond to selections of either 'storage access' 332 or 'ship' 332' and includes a group of photographic images P1-P6, corresponding to a group of stored items in a particular storage unit or vault, along with corresponding selection boxes 45 for designating which items are selected. If the customer has more than one vault of items, more than one group of photographic images is accessible via vault links 47. FIG. 3C further illustrates page 340 including a listing of a sequence of steps 46 for providing instructions; listing of steps 46, as illustrated, show that the customer is at step 2, corresponding to step 34 of FIG. 3A, that in a preceding step the customer has entered date and time information, and that in following steps the customer will be asked to verify or confirm entered information and selections and proceed through a checkout or fee payment process.

Figure 4A:
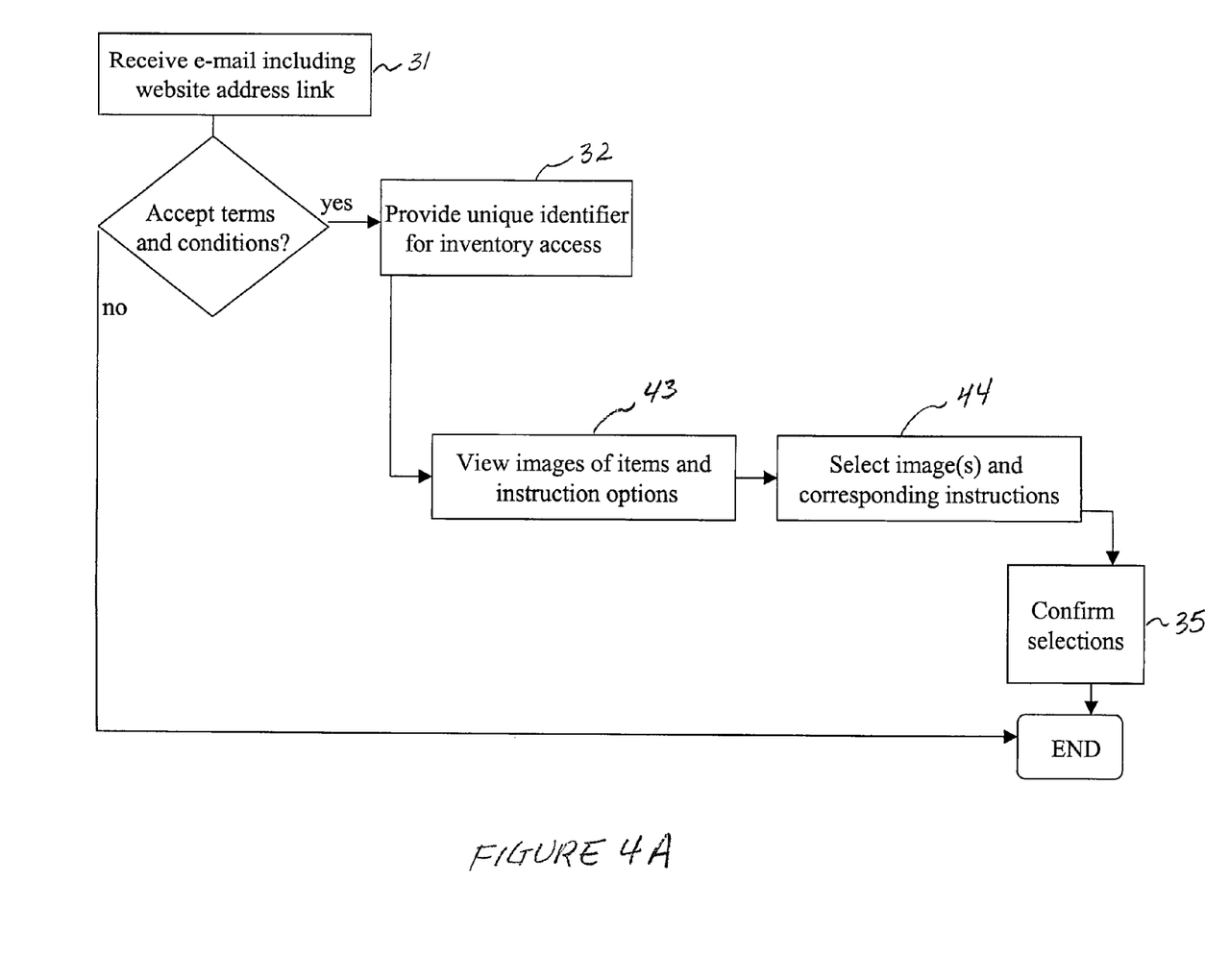
FIG. 4A is a flowchart outlining an alternative method of the present invention for using a remote access portion of a storage system according to some embodiments of the present invention.
Figure 4B:
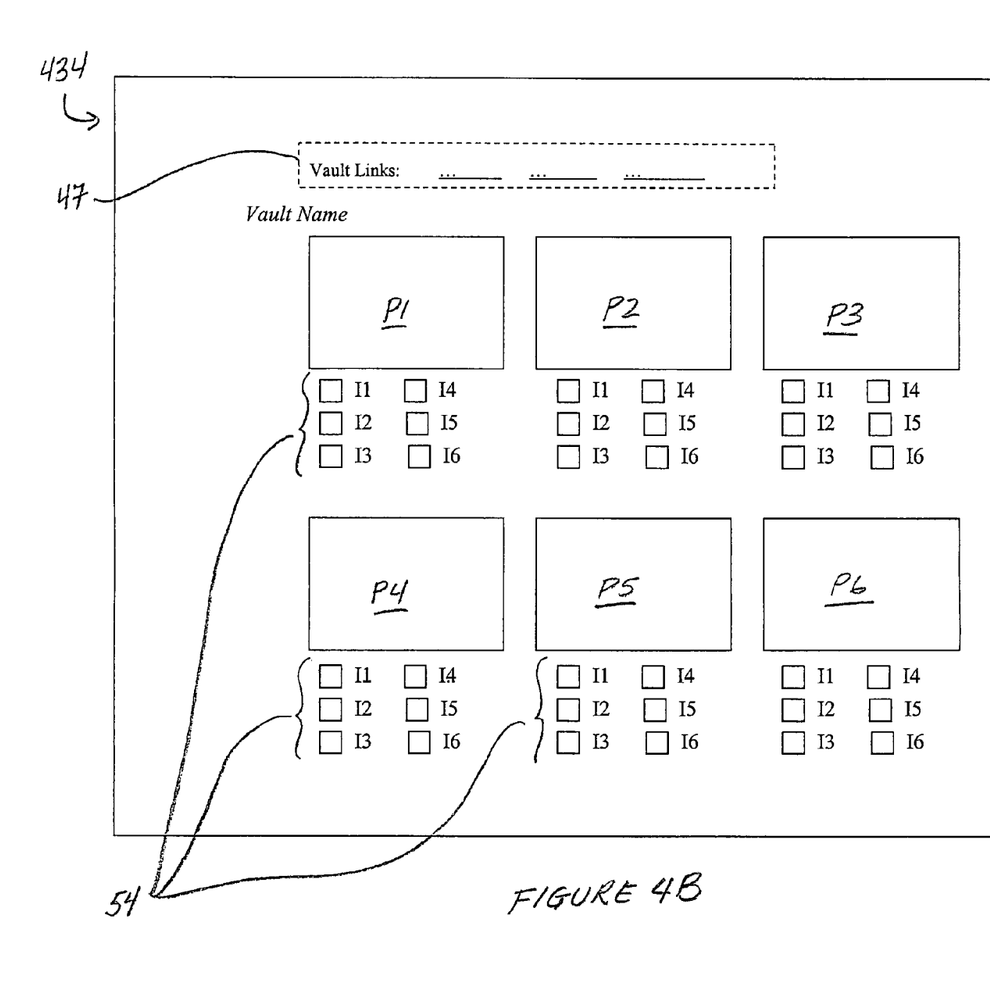
FIG. 4B is an exemplary user interface corresponding to the flowchart of FIG. 4A.

FIG. 4A is a flowchart outlining an alternative method of the present invention for using a remote access portion of a storage system according to some embodiments of the present invention; and FIG. 4B is an exemplary user interface corresponding to the flowchart of FIG. 4A. According to the method outlined in FIG. 4A, after steps 31 and 32, as previously described, the customer would view a group of photographic images corresponding to a group of stored items in conjunction with a list of instruction options for each item (step 43) so that the customer could simultaneously select items and corresponding instructions (step 44) via corresponding interactive elements. For example, FIG. 4B illustrates an exemplary web page 434 corresponding to steps 43 and 44 of FIG. 4A and including the group of photographic images P1-P6 corresponding to the group of stored items in the vault selected from vault links 47. FIG. 4B further illustrates a group of interactive elements or selection boxes 54 for each image P1-P6; each group of boxes 54 includes an instruction I1-I6 for the associated item as represented by the image. After making selections of items and instructions concerning the items, the customer would proceed to provide additional information, as necessary, via entry into fields displayed on other pages of the website, and to verify or confirm the selections and entered information.

Referring back to FIG. 3B, further options, which may be selected by a customer at the website, are shown under 'my account'; the customer may review their account history, payments that have been made, an overall profile of the account, and may request password assistance.

Once the customer has completed a process for providing instructions according to one of the embodiments described above, the associated computer inventories of the storage facility database are flagged accordingly and a storage facility representative receives notice of the instructions, for example, via an e-mail, either directed from the website or from the database, or via a database manager or administrator that regularly monitors the database for flags. The database administrator may further perform regular or on-demand searches to keep storage facility representatives up to date on the status of all the computer inventories and associated storage units or vaults; search criteria for the database, include but are not limited to, order number, customer name, vault number, inventory name, vault assignment date, and moving date. The database administrator may be a human being, a computer program or a combination thereof.

In the foregoing detailed description, the invention has been described with reference to specific embodiments. However, it may be appreciated that various modifications and changes can be made without departing from the scope of the invention as set forth in the appended claims. For example, although exemplary embodiments of the present invention have been described in the context of Internet access to the storage facility database, it is contemplated that, according to alternate embodiments, a computer inventory of stored items be provided to customer on a computer readable medium, i.e. a CD ROM disk, which may be loaded into the personal computer of the customer and accessed 'off-line' or directly without linking to the storage facility. According to these alternate embodiments, the customer could prepare instructions for certain stored items 'off-line' and then send, via e-mail, fax or regular mail, the instructions to the storage company.

I claim:

1. A storage system for managing groups of property items, the system comprising:

a plurality of storage units, each storage unit being assigned to a corresponding customer and being sized to contain for storage every item of a group of various miscellaneous property items associated with the customer, every property item of the group having been moved from a site of the corresponding customer, and each storage unit being either a room in a storage facility or a portable storage container;

a database including a computerized inventory for each assigned storage unit, each inventory including a record corresponding to each property item in the corresponding group of items associated with the customer and being stored in the corresponding assigned storage unit, and each record including a photographic image of the corresponding stored item; and a link between each customer and the database, the link including an Internet website that provides access for each customer to view the photographic images of the computerized inventory of the corresponding group of property items; and wherein the website includes at least one interactive element and a group of selectable instructions, the at least one interactive element being configured to allow each customer to select one or more photographic images, which correspond to one or more property items from the corresponding group of property items associated with the customer and being stored in the corresponding assigned storage unit, and to select instructions from the group of instructions concerning the one or more property items, and to send the selected instructions to personnel of the storage facility.

2. The system of claim 1, wherein the database is searchable according to an unique identifier associated with the inventory of each assigned storage unit.

3. The system of claim 2, wherein each unique identifier includes a number associated with the corresponding assigned storage unit.

4. The system of claim 2, wherein each unique identifier includes a name of the corresponding customer.

5. The system of claim 2, wherein each unique identifier includes a name assigned to the inventory by the corresponding customer.

6. The system of claim 1, wherein each record further includes an alpha-numeric string identifier.

7. The system of claim 1, wherein each record further includes a bar code identifier.

8. The system of claim 1, wherein the Internet website is configured to require authorization, via an input of an unique identifier, to allow each customer access to the computerized inventory.

9. The system of claim 1, wherein the group of instructions includes instructions to move the one or more property items corresponding to the one or more selected photographic images out from the storage unit.

10. The system of claim 1, wherein the group of instructions includes instructions to move the one or more property items corresponding to the one or more selected photographic images from the corresponding assigned storage unit to another storage unit of the plurality of storage units.

11. The system of claim 1, wherein the group of instructions includes instructions to move the one or more property items corresponding to the one or more selected photographic images to a location outside the storage facility.

12. The system of claim 1, wherein the group of instructions includes instructions to donate the one or more property items corresponding to the one or more selected photographic images to an organization.

13. The system of claim 1, wherein the group of instructions includes instructions to auction the one or more property items corresponding to the one or more selected photographic images.

14. The system of claim 1, wherein the link between the customer and the storage facility database further includes a computer readable medium containing a copy of the inventory.

15. The system of claim 1, further comprising a moving van for moving each group of property items from the site of the corresponding customer into the corresponding assigned storage unit.

16. A method for managing a group of various miscellaneous property items, the method comprising:

assigning a customer a storage unit from among a plurality of storage units, the assigned storage unit being sized to contain all of the group of various miscellaneous property items for storage;

moving all of the group of various miscellaneous property items from a site of the customer into the assigned storage unit;

creating a computer inventory for the assigned storage unit, the inventory including a record for each item of the group of various miscellaneous property items that are moved into the storage unit;

creating a photographic image of each item of the group of various miscellaneous property items;

entering the photographic image of each item into the corresponding record of the computer inventory;

linking the computer inventory to a remote computer terminal to provide the customer access to the photographic image of each item of the group of various miscellaneous property items that have been moved into the storage unit;

providing an Internet website as a user interface in linking the computer inventory to the remote computer terminal; and providing at least one interactive element and a list of selectable instructions on the Internet website, the at least one interactive element enabling the customer to select one or more photographic images corresponding to one or more items from the group of various miscellaneous property items that have been moved into the storage unit, and to select instructions from the list of instructions concerning the one or more items corresponding to the one or more selected photographic images.

17. The method of claim 16, further comprising providing the customer with an unique identifier required for accessing the computer inventory.

18. The method of claim 16, further comprising storing the photographic image on a computer readable medium prior to entering the image into the corresponding record.

19. The method of claim 16, wherein entering the photographic image into the corresponding record is performed when the photographic image is created.

20. The method of claim 16, further comprising providing another at least one interactive element for selecting the group of items from additional groups of items corresponding to additional storage units having been assigned to the customer from the plurality of storage units for the storage of additional property items of the customer.

21. The method of claim 16, wherein:

the selectable list of instructions includes at least one of the following: instructions to move the one or more items from the assigned storage unit to another storage unit, instructions to donate the one or more items and instructions to auction the one or more items; and the at least one interactive element further enables the customer to send the selected instructions to personnel that have direct access to the storage unit for carrying out the selected instructions.

22. A method for managing a group of various miscellaneous property items, the method comprising:

moving all of the group of various miscellaneous property items belonging to a customer, from a site of the customer and into an assigned storage unit;

creating a computer inventory for the assigned storage unit, the inventory including a record for each item of the group of various miscellaneous property items that are moved into the storage unit;

creating a photographic image of each item of the group of various miscellaneous property items;

entering the photographic image of each item into the corresponding record of the computer inventory;

linking the computer inventory to a remote computer terminal to provide the customer access to the photographic image of each item of the group of various miscellaneous property items that have been moved into the storage unit;

providing at least one interactive element and a list of selectable instructions, via the linking of the computer inventory to the remote computer terminal, the at least one interactive element enabling the customer to select one or more of the photographic images corresponding to one or more items from the group of various miscellaneous property items that have been moved into the storage unit, to select instructions from the list of selectable instructions concerning the one or more items corresponding to the one or more selected photographic images, and to send the selected instructions to personnel that have direct access to the storage unit;

using the selected one or more photographic images to identify the corresponding one or more items of the group of various miscellaneous property items that have been moved into the storage unit; and segregating the identified one or more items from a remainder of the group of various miscellaneous property items that have been moved into the storage unit in order to carry out the selected instructions.

23. The method of claim 22, wherein the list of selectable instructions includes more than one of the following: instructions to move the one or more items out from the assigned storage unit, instructions to donate the one or more items and instructions to auction the one or more items.

24. The method of claim 22, further comprising providing the customer with an unique identifier required for accessing the computer inventory.

25. The method of claim 22, further comprising storing the photographic image on a computer readable medium prior to entering the image into the corresponding record.

26. The method of claim 22, wherein entering the photographic image into the corresponding record is performed when the photographic image is created.

27. The method of claim 22, wherein linking the computer inventory to the remote computer terminal is accomplished via the Internet.

28. The method of claim 22, further comprising providing an Internet website as a user interface in linking the computer inventory to the remote computer terminal.

\* \* \* \* \*